(12) United States Patent
Wong et al.

(10) Patent No.: US 9,875,119 B2
(45) Date of Patent: Jan. 23, 2018

(54) EXTENSIBILITY FRAMEWORK

(71) Applicants: Johnson Wong, Vancouver (CA); David Mosimann, New Westminster (CA); Greg Golds, Vancouver (CA); Jiandong Shi, Longjiang Road (CN); Sebastien Foucault, Paris (FR); Jonathan Heller, Nirit (IL)

(72) Inventors: Johnson Wong, Vancouver (CA); David Mosimann, New Westminster (CA); Greg Golds, Vancouver (CA); Jiandong Shi, Longjiang Road (CN); Sebastien Foucault, Paris (FR); Jonathan Heller, Nirit (IL)

(73) Assignee: Business Objects Software Ltd., Dublin (IE)

( * ) Notice: Subject to any disclaimer, the term of this patent is extended or adjusted under 35 U.S.C. 154(b) by 144 days.

(21) Appl. No.: 14/560,416

(22) Filed: Dec. 4, 2014

(65) Prior Publication Data

US 2016/0162264 A1  Jun. 9, 2016

(51) Int. Cl.
*G06F 9/44* (2006.01)
*G06F 9/445* (2006.01)

(52) U.S. Cl.
CPC ...... *G06F 9/44521* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2006/0184926 A1* | 8/2006 | Or | G06F 8/61 717/168 |
| 2006/0242625 A1* | 10/2006 | Fey | G06F 8/61 717/118 |
| 2007/0083925 A1* | 4/2007 | Hargrave | H04L 41/08 726/14 |
| 2007/0101313 A1* | 5/2007 | Bodin | G10L 13/00 717/114 |

(Continued)

OTHER PUBLICATIONS

The OSGi Alliance, "OSGi Core Release 5", Mar. 2012, https://www.osgi.org/developer/spcifications/, accessed on Apr. 29, 2016.*

*Primary Examiner* — H S Sough
*Assistant Examiner* — Timothy Duncan
(74) *Attorney, Agent, or Firm* — Schwegman Lundberg & Woessner, P.A.

(57) ABSTRACT

In an example embodiment, a bundle loader is run in response to a communication from an application. The communication may indicate that the plurality of bundles of components in the application is to be executed. The plurality of bundles may include at least one bundle having a component that depends on a dependency component in another of the plurality of bundles. A configuration file indicating a set of the plurality of bundles to load in the bundle loader is received. The bundle loader is operated to load a bundle manifest for each bundle in the set of the plurality of bundles to load. Then, for each of the bundles in the set of plurality of bundles to load, the bundle is activated if no unactivated dependency component exists for any component in the bundle.

19 Claims, 14 Drawing Sheets

(56) References Cited

U.S. PATENT DOCUMENTS

| | | | |
|---|---|---|---|
| 2011/0295984 A1* | 12/2011 | Kunze | G06F 8/62 709/220 |
| 2012/0079383 A1* | 3/2012 | Thanumalayan | G06F 9/4443 715/716 |
| 2014/0082589 A1* | 3/2014 | Ohuchi | G06F 8/71 717/116 |
| 2014/0380340 A1* | 12/2014 | Knichel | G06F 9/4411 719/327 |

* cited by examiner

EXTENSIBILITY FRAMEWORK

TECHNICAL FIELD

This document generally relates to methods and systems for use with computer networks. More particularly, this document relates to an extensibility framework for use with dynamic computer programming languages.

BACKGROUND

With the ever growing transition towards web and mobile technologies comes an increasing focus on applications written using JAVASCRIPT™. JAVASCRIPT™ is a dynamic computer programming language and, more specifically, a prototype-based scripting language with dynamic typing and first-class functions, but JAVASCRIPT™ was never intended to be a rich programming language providing many of the capabilities and well-defined structure offered by other languages such as Java. One major problem with this is that JAVASCRIPT™ applications tend to take on a monolithic, static form, making it difficult or even impossible to develop and deploy different pieces of application functionality independently.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, an extensibility framework is provided that allows JAVASCRIPT™ (or other dynamic computer programming scripting language) applications to be broken down into components that can be independently deployed or enabled based on runtime factors. From the practical perspective, this can allow development of applications to he easily distributed across development teams, enable new features to be incorporated after a release of an application has shipped, and support multiple applications/deployments from a common set of components. In an example embodiment, a clear mechanism by which components extend the system can be defined, and a high degree of decoupling can be enforced between components.

Figure 1:
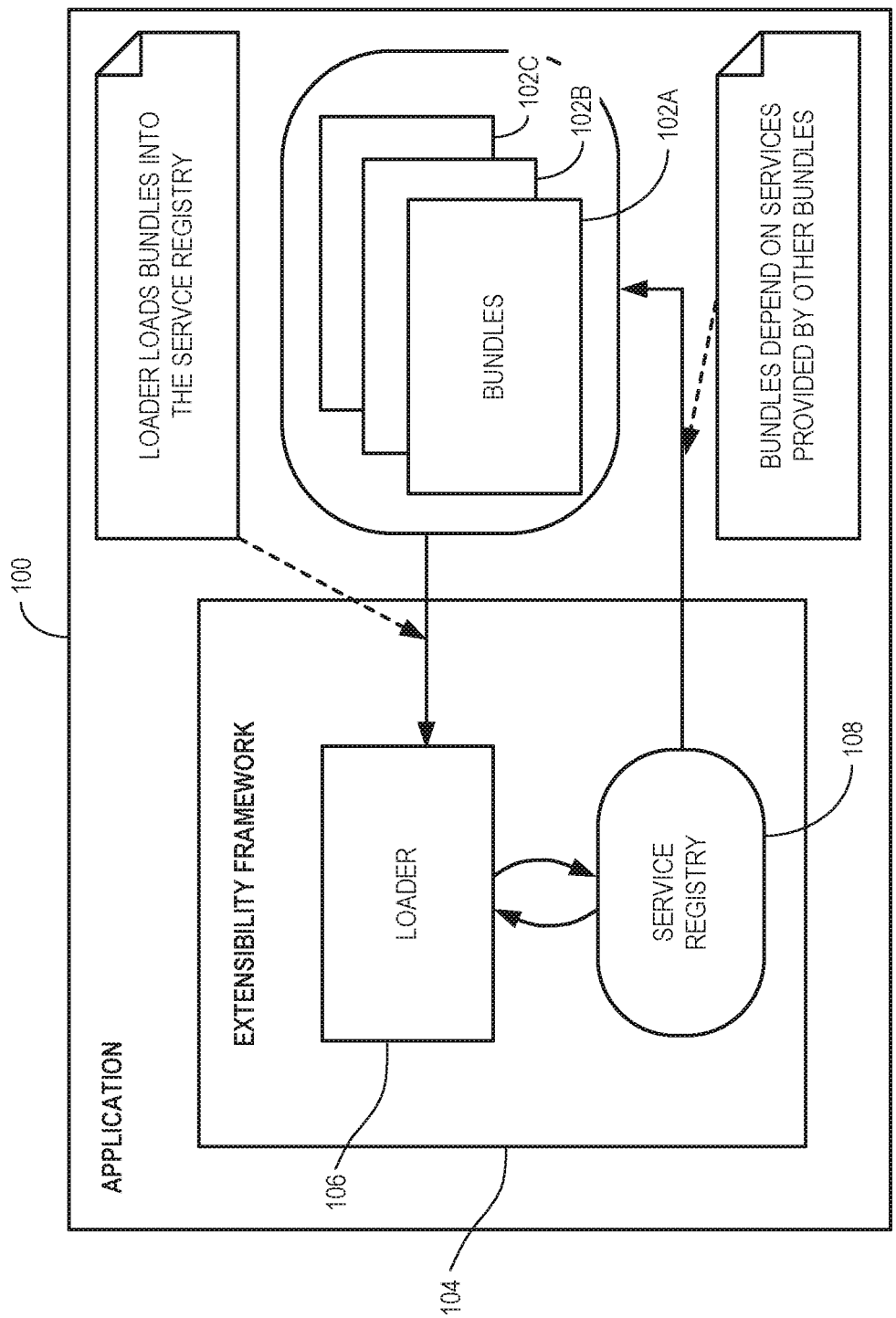
FIG. 1 is a block diagram illustrating an application, in accordance with an example embodiment.

Figure 1 is a block diagram illustrating an application 100, in accordance with an example embodiment. The application may be written in a dynamic computer programming scripting language such as JAVASCRIPT™. The application 100 may comprise one or more bundles 102A-102C of components. A bundle is an application-internal representation of a group of components that logically belong together. Multiple bundles can be grouped into a feature, which is an external (e.g., customer or user-facing) representation of a piece of application functionality. Each application 100 can be thought of as a plurality of components that interact through abstract dependencies. As such, while bundles 102A-102C are depicted in FIG. 1, in various example embodiments the application can be broken into any combination of components, bundles, and features, as will be described in more detail below.

The application 100 may also comprise an extensibility framework 104. The extensibility framework 104 may include a loader 106 and a service registry 108. The loader 106 may act to load a given set of bundles 102A-102C (or more generally, any combination of components, bundles, and features). In an example embodiment, different bundle loaders are used for different environments (e.g., browser, desktop, etc.). A bundle may be represented by a bundle manifest (a bundle.js file in an example embodiment). The bundle manifest may declare what is provided by the bundle and any dependencies the bundle has. The service registry 108 may be a data structure or data structures that store loaded components (service implementations) and may act to keep track of which components provide which service. The loader 106 may act to load the bundles 102A-102C (or more generally, any combination of components, bundles, and features) into the service registry, and the service registry 108 may then keep track of which bundles 102A-102C (or more generally, any combination of components, bundles, and features) depend on services provided by other bundles 102A-102C (or more generally, any combination of components, bundles, and features).

Figure 2:
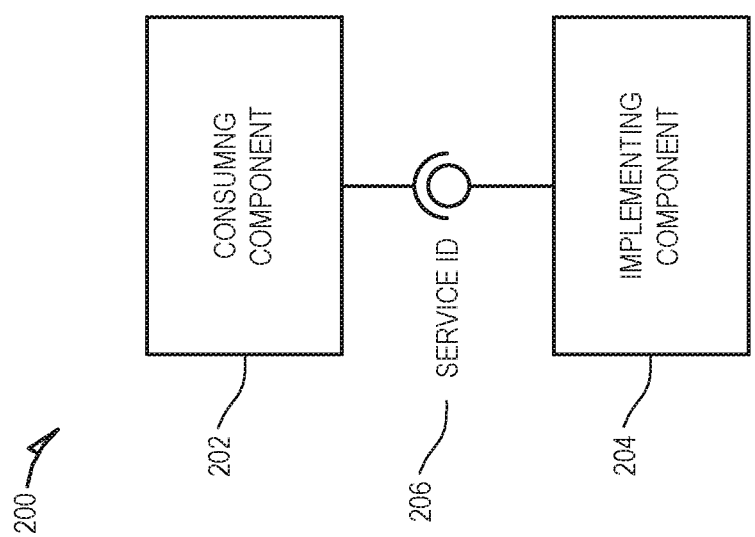
FIG. 2 is a block diagram illustrating a dependency injection, in accordance with an example embodiment.

In an example embodiment, the extensibility framework 104 breaks down an application into components that interact through the concept of abstract dependencies. Dependencies may be expressed as abstract services rather than concrete implementations. At runtime, the concrete implementation of a service is dynamically fulfilled by the framework and provide to the component specifying the dependency. This process is referred to as a dependency injection. FIG. 2 is a block diagram illustrating a dependency injection 200, in accordance with an example embodiment. A consuming component 202 may dynamically depend at runtime on an implementing component 204. At runtime, the extensibility framework may dynamically fulfill a concrete implementation of a service provided by the implementing component 204 and provide the service, indicated by service identification 206, to the consuming component 202. This allows for decoupling of components by removing direct dependencies between them. This may also allow for implementations of a given service to be swapped at runtime without needing to modify the dependent component's implementation. Additionally, this may allow for implementations to transparently extend other implementations by providing the same abstract service.

Figure 3:
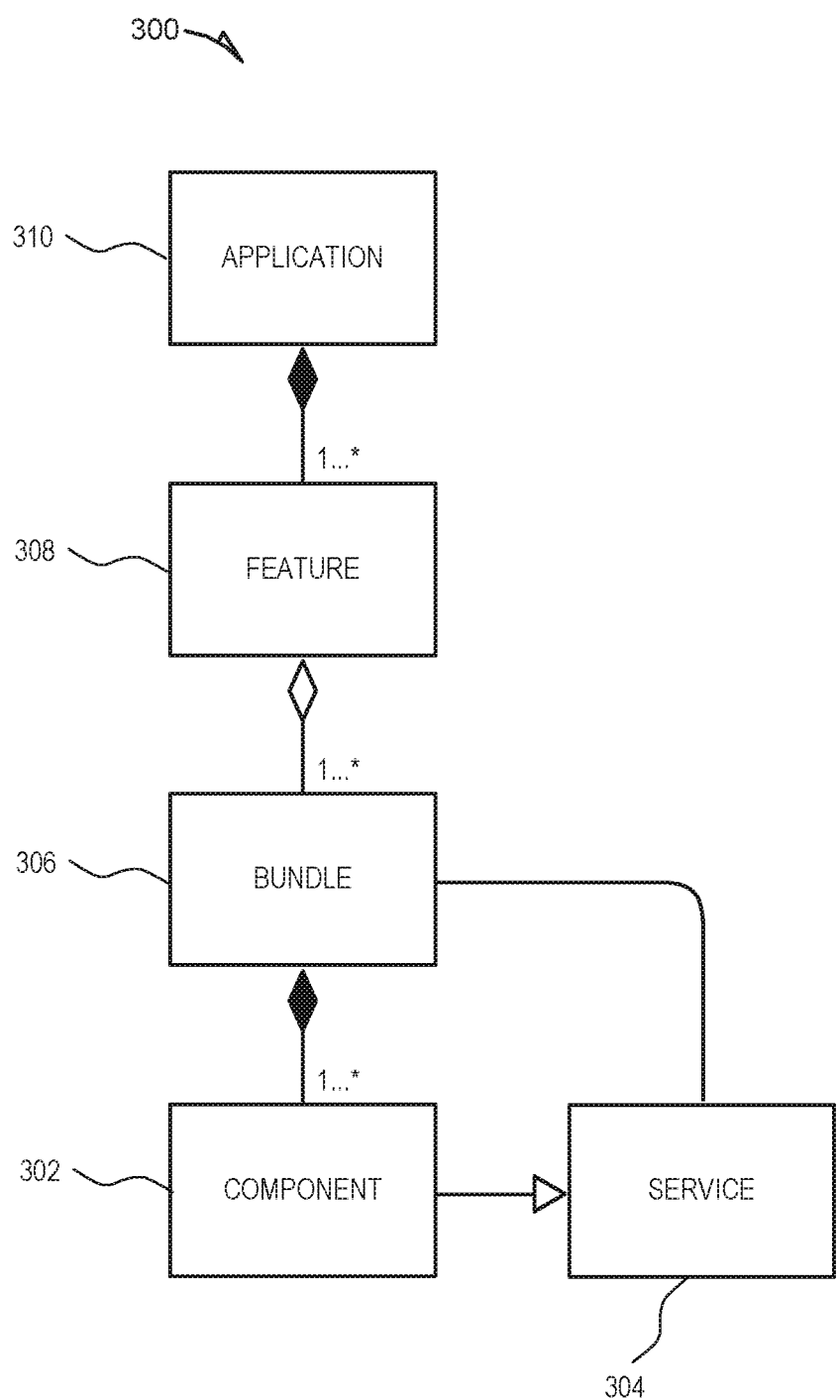
FIG. 3 is a block diagram illustrating an organization of components, in accordance with an example embodiment.

How components are organized in the extensibility framework 104 can vary greatly based on the specific implementation. FIG. 3 is a block diagram illustrating an organization 300 of components 302, in accordance with an example embodiment. A component 302 may implement a service 304. Multiple components 302 can be grouped into a bundle 306. Multiple bundles 306 can be grouped into a feature 308. Multiple features 308 together can make up an application 310.

In an example embodiment, a minimal set of metadata is used to describe these relationships. The format and storage of this metadata can vary greatly based on the specific implementation. For example, each bundle could be described by a bundle manifest, which is a single file holding a bundle's metadata. The following is an example of a format of this type of metadata:

```
{
    id: <Bundle ID>,
    version: <Bundle version>,
    components: [ <List of components within this bundle>
        {
            id: <Component ID>
            provide: <Service ID provided by this component>
            module: <Module containing this component's implementation>
        }
    ],
    dependencies: [
        <List of abstract dependencies (uniquely identified by service ID)
        this bundle depends on>
    ]
}
```

Similarly, each feature could be described by a feature manifest, which is a single file holding a feature's metadata. The following is an example of a format of this type of metadata:

```
{
    id: <Feature ID>,
    name: <User friendly feature name>,
```

-continued

```
    description: <User friendly feature description>,
    version: <Feature version>,
    bundles: [
        <List of bundles included in this feature
        uniquely identified by their bundle ID and
        version>
        {
            id: <Bundle ID>,
            version: <Bundle version>
        }
    ]
}
```

Figure 4:
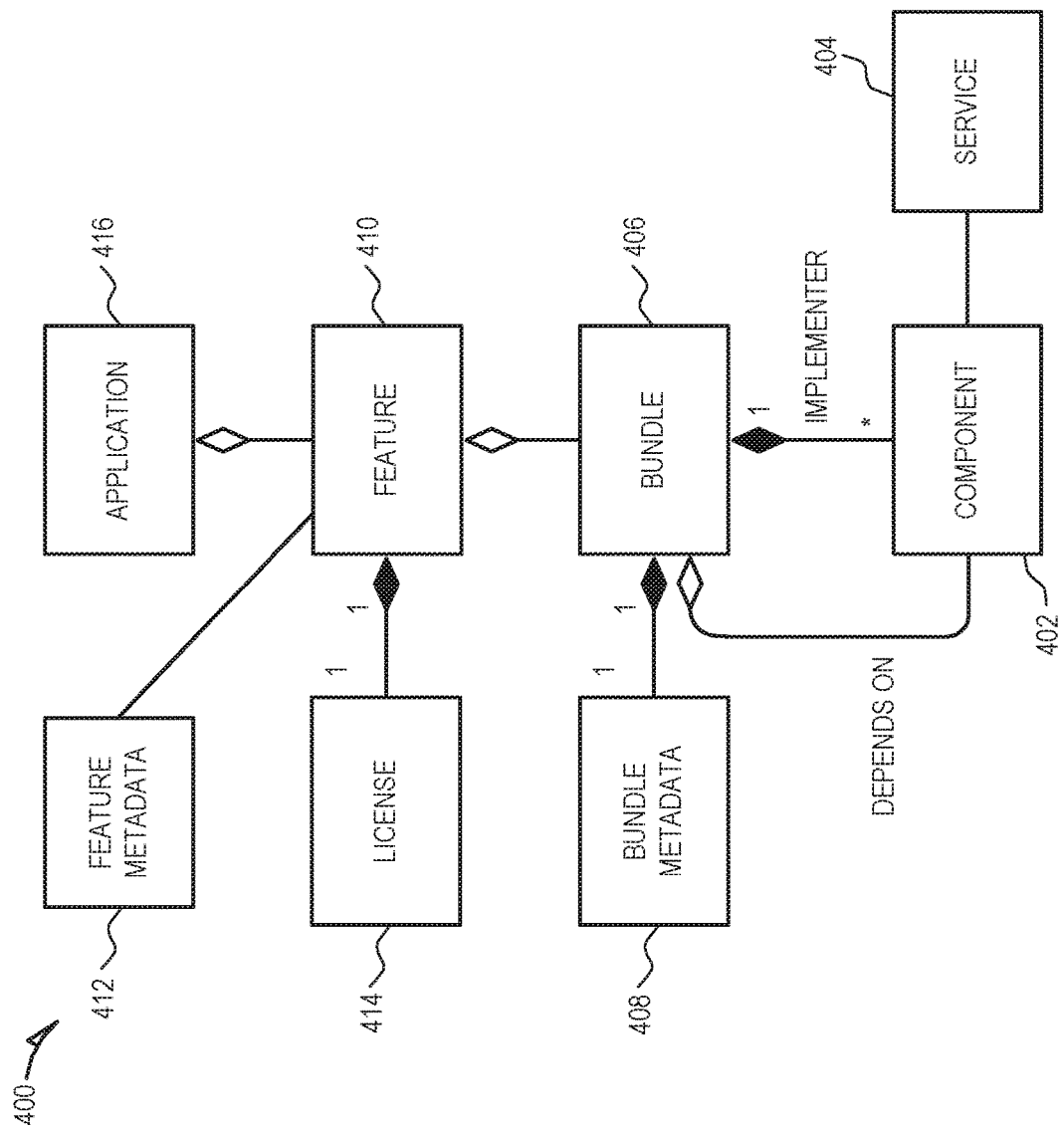
FIG. 4 is a block diagram illustrating an organization of components, in accordance with another example embodiment.

FIG. 4 is a block diagram illustrating an organization 400 of components 402, in accordance with another example embodiment. Here, as with FIG. 3, a component 402 may implement a service 404. The service 404 may be an interface and implementation of an individual piece of functionality. One or more components 402 may be grouped in a bundle 406. The bundle 406 may represent a deployable unit of code. It may expose the services that are required to implement a feature. The bundle 406 may be described by bundle metadata 408. One or more bundles 406 may be grouped into a feature 410. The feature 410 may represent a user-visible artifact. The feature 410 represents the level of granularity that users can purchase and enable. The feature 410 may be described by feature metadata 412 and may be enabled through the purchase of a license 414. One or more features 410 can be grouped into an application 416.

Information about the components, services, bundles, and features may be stored in a repository. For purposes of this disclosure, this repository may be referred to as a bundle repository, although it stores metadata regarding components, services, and features in addition to metadata about bundles. The implementation of this repository can vary greatly depending on deployment. In an in-memory database management system deployment, the bundle repository may be implemented as a set of packages and objects, and an application program interface (API) may be provided to efficiently access the objects. In a desktop deployment, the bundle repository may be implemented as a set of files in a file system. There is no physical server to host the repository API. Instead, the application can directly manipulate the file system to modify the bundle repository.

Figure 5:
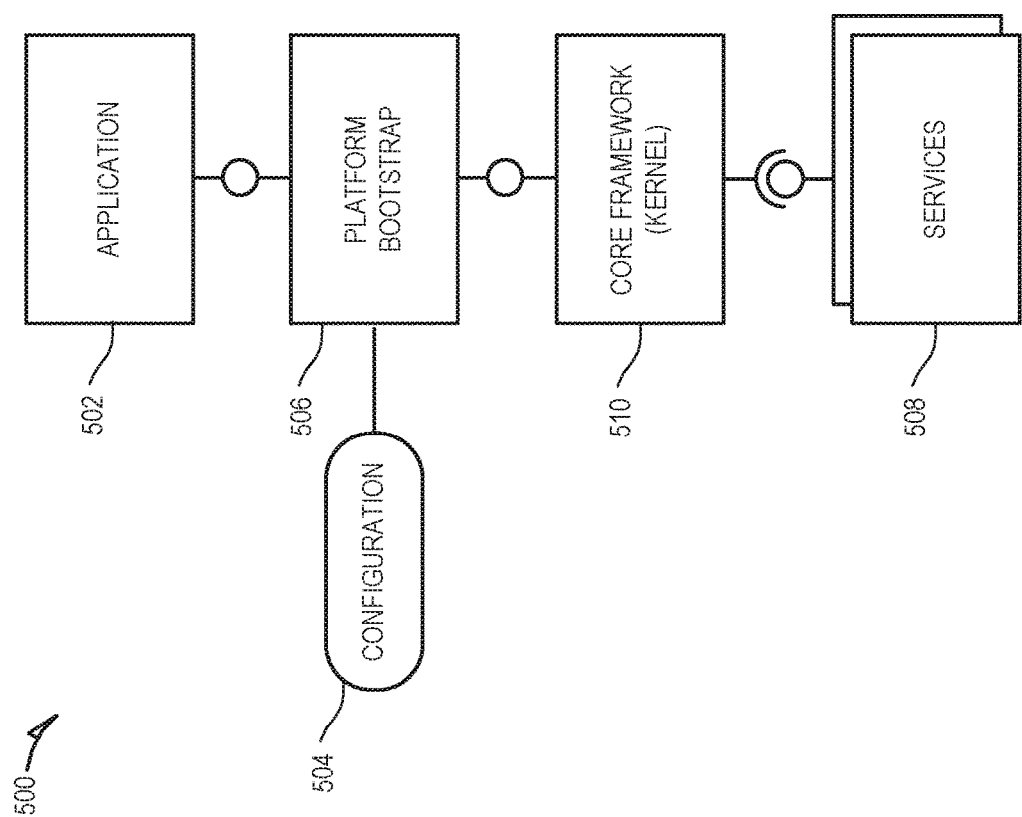
FIG. 5 is a diagram illustrating a system at runtime, in accordance with an example embodiment.

FIG. 5 is a diagram illustrating a system 500 at runtime, in accordance with an example embodiment. The system 500 includes an application 502. The application may be, for example, a thick client such as an executable file (e.g., .exe), a web page such a HyperText Markup Language (HTML) page with JAVASCRIPT™ (e.g., .html/.js), or a server-side script endpoint (e.g., .xsjs). A configuration file 504 may be fed to a platform bootstrap 506, which instantiates an extensibility framework and uses a platform specific loader to load services 508 related to components identified in the extensibility framework (and possibly defined by the configuration file 504). A core framework 510, which may be identical for all platforms, may connect the extensibility framework to the services 508.

Figure 6:
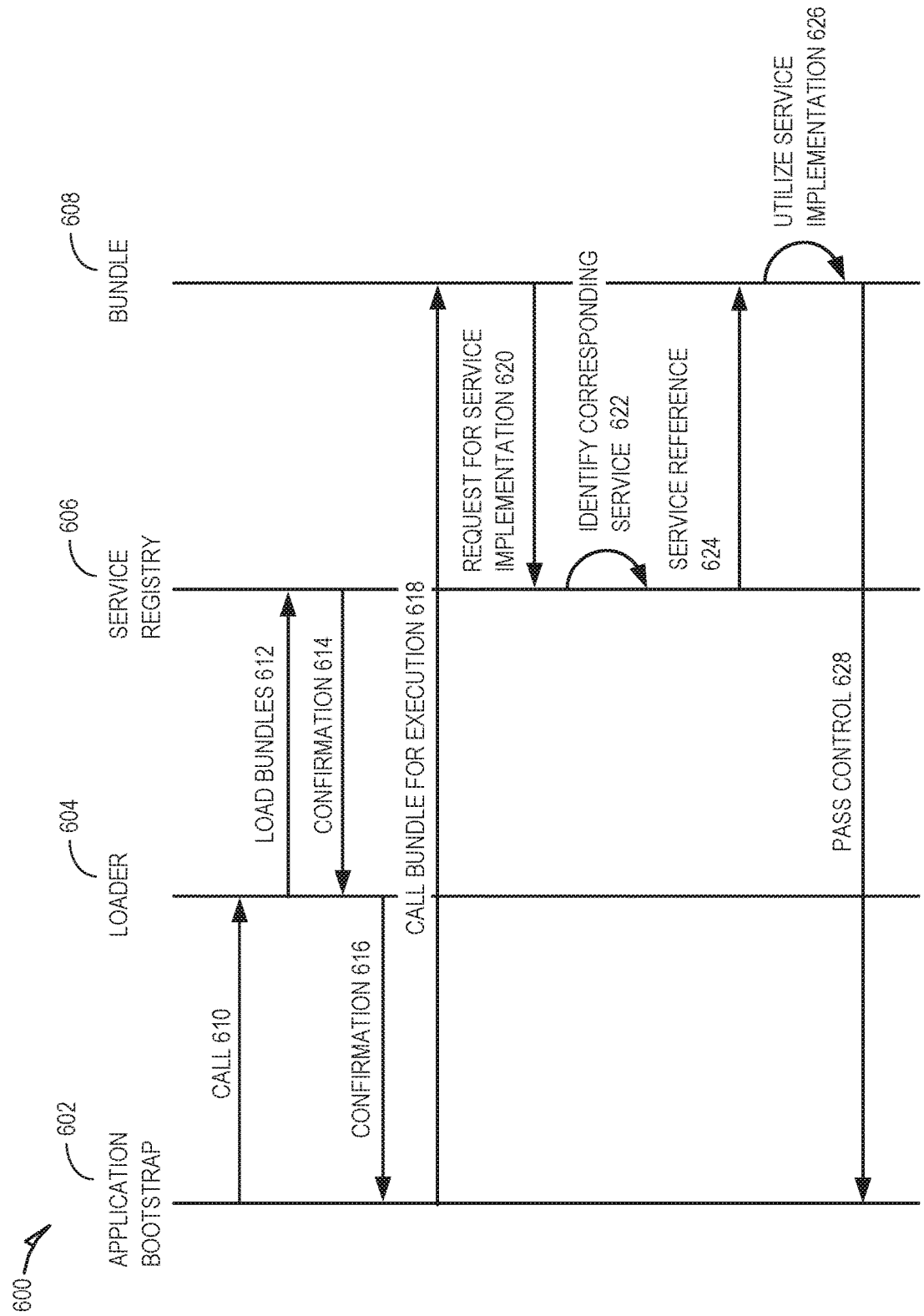
FIG. 6 is a sequence diagram illustrating a method for running an extensibility framework, in accordance with an example embodiment.

FIG. 6 is a sequence diagram illustrating a method 600 for running an extensibility framework, in accordance with an example embodiment. The method 600 may utilize an application bootstrap 602, a loader 604, a service registry 606, and a bundle 608. The term bundle should be interpreted broadly to encompass any combination of components, either at the component, bundle, or feature level. At operation 610, the application bootstrap 602 may call a loader 604, which at operation 612 may load one or more bundles into the service registry 606. At operation 614 the service registry 606 may send a confirmation message to the loader 604, which at operation 616 confirms to the application bootstrap 602 that the bundle(s) have been loaded.

At some point later when a component in the bundle is called, at operation 618 the application bootstrap 602 may call the bundle 608 for execution. The bundle 608 may depend on an abstract service. When this abstract service call is encountered in the bundle 608, at operation 620 the bundle 608 may send a request for service implementation to the service registry 606. At operation 622, the service registry 606 may identify a corresponding service, and at operation 624 it may send a reference to the service implementation to the bundle 608. At operation 626, the bundle 608 may utilize the service implementation identified by the reference returned by the service registry 606. Once complete, at operation 628 control may be passed back to the application bootstrap 602.

Figure 7:
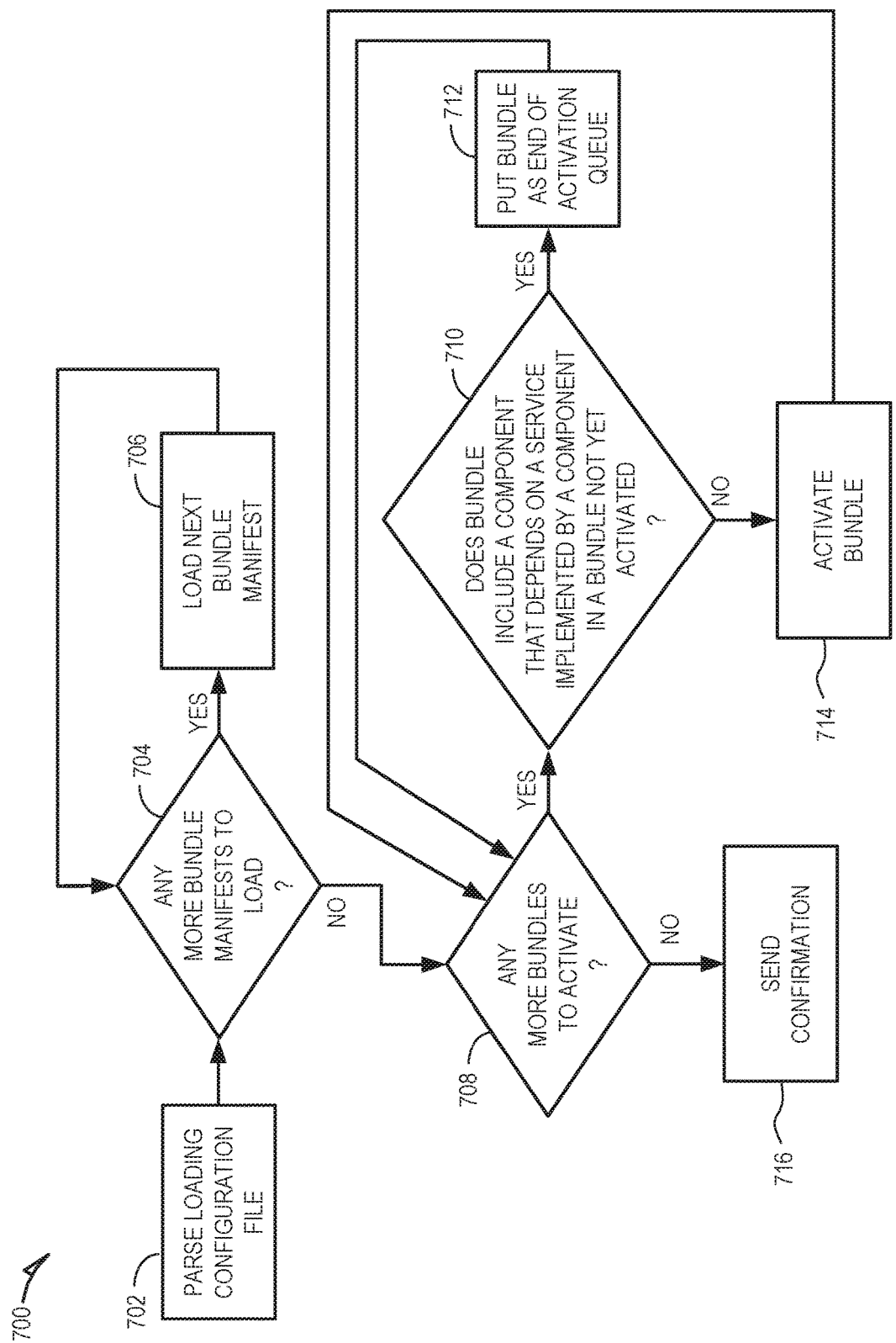
FIG. 7 is a flow diagram illustrating a method for loading a bundle into a service registry, in accordance with an example embodiment.

There are many ways in which a loader 604 may be implemented. FIG. 7 is a flow diagram illustrating a method 700 for loading a bundle into a service registry, in accordance with an example embodiment. At operation 702, a loading configuration file can be parsed. The loading configuration file may identify one or more bundle manifests to load. At operation 704, it may be determined if there are any more bundle manifests in the loading configuration file to load. If so, then at operation 706, the next bundle manifest may be loaded into the service registry. This may include loading and parsing all bundle metadata for the corresponding bundle in the bundle manifest. Once all bundle manifests have been loaded, at operation 708 it may be determined if there are any more bundles to activate. This may include examining an activation queue containing all the bundles to activate. If so, then the next bundle to activate may be (attempted to be) activated. This may include taking the bundle from the head of the activation queue. In this operation, all components within each bundle can be instantiated. The components may be activated in dependency order. This means that if a component in bundle A depends on a service implemented by bundle B, the component in bundle A is not instantiated until the component providing the dependent service in bundle B is instantiated first. In this example, bundles that have dependencies that have not been activated yet have their activation deferred (e.g., placed at the end of the activation queue). The idea here is that all their dependencies will have been activated by the time they attempt activation again. Therefore, at operation 710 it may be determined if the bundle includes a component that depends on a service implemented by a component in a bundle not yet activated. If so, then at operation 712 the bundle may be placed at the end of an activation queue. If not, then at operation 714 the bundle may be activated.

Once all bundles have been activated, then at operation 716 a confirmation may be sent indicating that all bundles have been activated.

Figure 8:
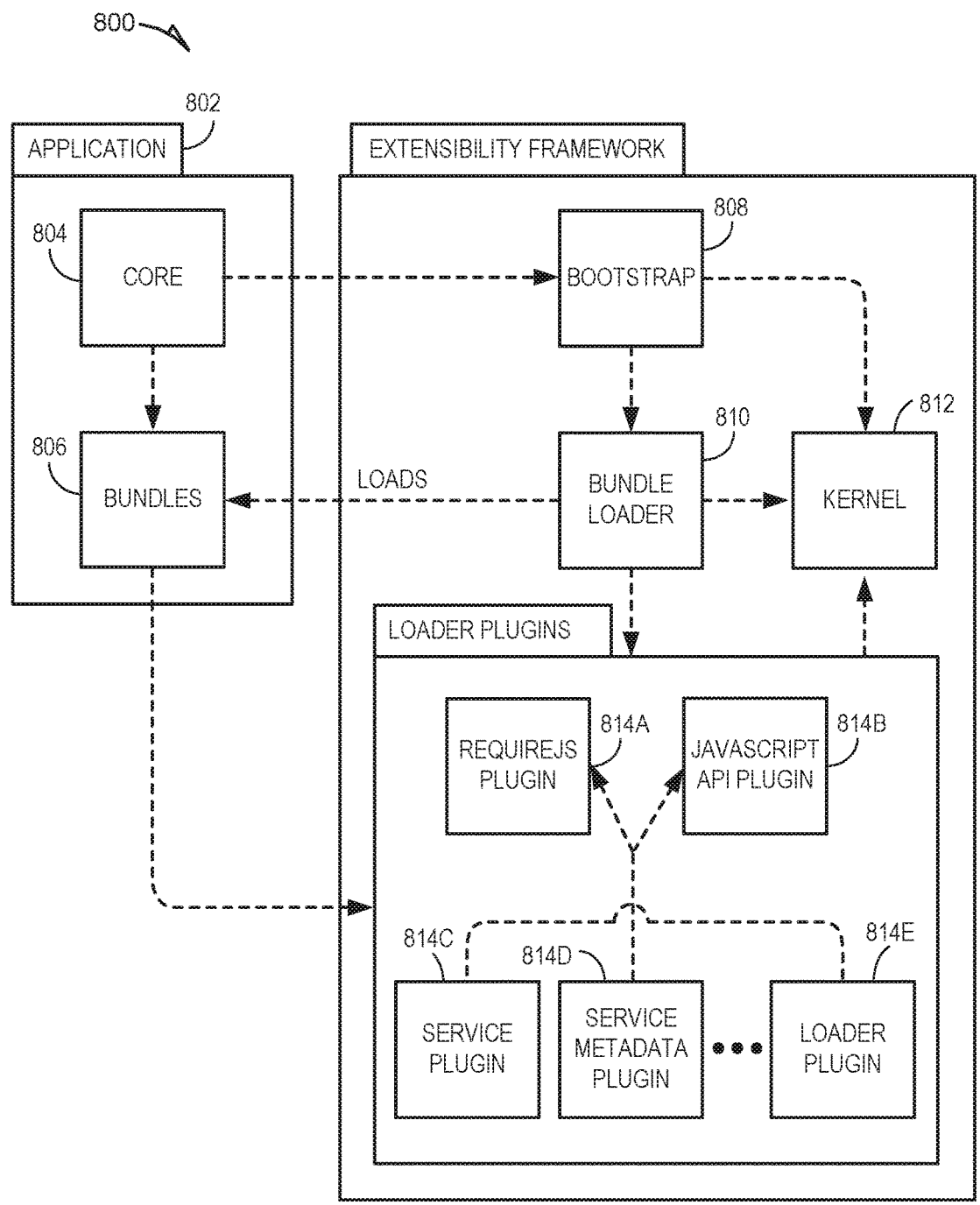
FIG. 8 is a block diagram illustrating a system for providing an extensibility framework, in accordance with another example embodiment.

FIG. 8 is a block diagram illustrating a system 800 for providing an extensibility framework, in accordance with another example embodiment. An application 802 may include a core 804 and one or more bundles 806. The core 804 may include code that is generic to all bundles 806, while each of the bundles 806 can have individualized code. The extensibility framework 800 provides a bootstrap 808, a bundle loader 810, and a kernel 812. The bundle loader 810 may reference multiple loader plugins 814A-814E that can be used by bundled content to reference dependent services, service metadata, and resources. The core 804 may include a minimal bootstrap which then calls the bootstrap 808 in the extensibility framework 800 to load any additional content.

In an example embodiment, the extensibility framework is designed in such a way that not all bundles have to be loaded at once during application startup; the loading of bundles can be deferred until they are absolutely needed. The term to describe this behavior is 'lazy loading' and can be implemented many ways. One example is to have the loading mechanism register itself into the service registry for other bundles in the application to use, thereby allowing the loading of bundles to be tied to an action that is separate and deferred from application start-up. Because of the separation between bundle metadata and component implementation, it is also possible to initially load only the former, which is usually small, and defer loading the latter, which is usually large and costly both in terms of network transfer time as well as time to parse and execute. This is useful when the application benefits from having bundle metadata up-front but does not wish to load the entire bundle's contents until later.

Lazy loading can help improve performance, which becomes more important as the application becomes more complex and involves many bundles. Lazy loading not only allows loading to be deferred so that the initial load becomes smaller and takes less time, but also makes it so the application simply does not load what it does not end up using.

In another example embodiment, selective deployment may be utilized. Similar to lazy loading, the level of componentization provided by the extensibility framework allows for application deployments themselves to be different under different scenarios by choosing which bundles to deploy. Examples of deployment scenario factors include the platform (e.g., desktop vs. cloud), user rights (e.g., guest vs. admin), and feature enablement (e.g. standard vs. pro license). One possible outcome of this is it becomes possible to deploy far less code when a given deployment only requires a small subset of the application's entire codebase.

In an example embodiment, each service can contribute additional functionality to an environment. There are no restrictions on what a service can expose. It can be a function used to expose new capabilities, a constructor/function used to expose new objects/components, or static information, such as a translated string. Services are independent and reference each other via the extensibility framework. Services do not directly reference another service's implementation, but instead access the other service via the extensibility framework. At runtime, the extensibility framework resolves all references between services. This ensures that all services are independent and can be replaced, extended, or omitted based on the needs of the application.

Figure 9:
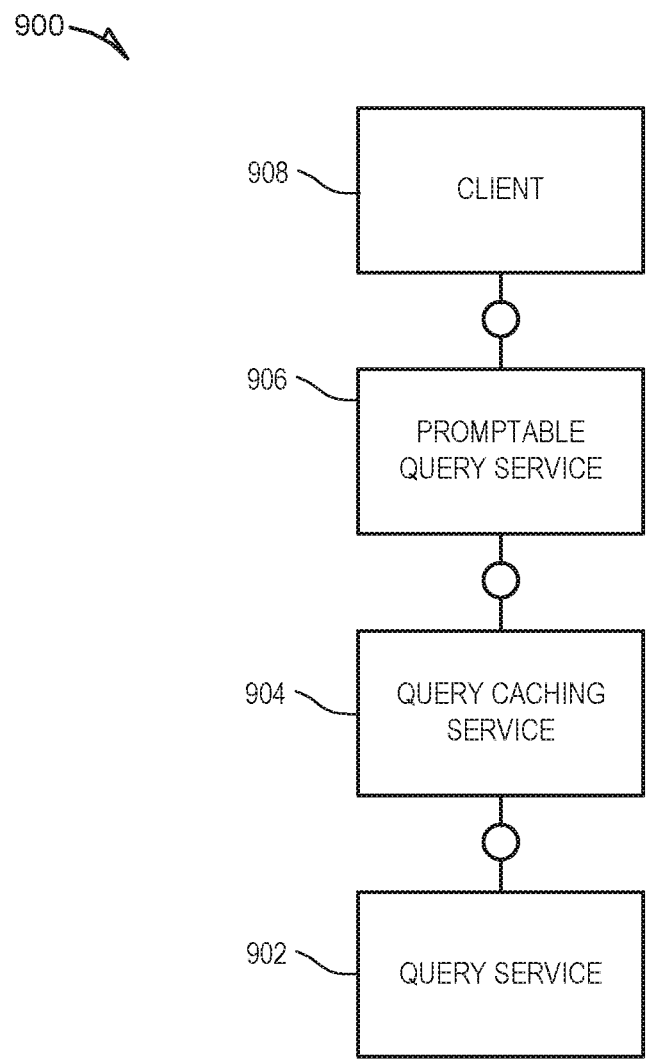
FIG. 9 is a diagram illustrating an example stack showing layering of functionality, in accordance with an example embodiment.

All services can be extended at runtime. When a service is declared, it can depend on the parent implementation and augment or replace the parent. This enables a layering of functionality. FIG. 9 is a diagram illustrating an example stack 900 showing layering of functionality, in accordance with an example embodiment. The stack 900 here is a caching service that can transparently extend a base service with no change to clients when enabled or disabled. A query service 902 implements an actual query. All services in the stack agree to expose the same interface, allowing the services to be interchangeable. A query caching service 904 can be added that caches the results of a query to improve performance. A promptable query service 906 can then augment a query with prompt values. The prompt values may not come from the same source as the query. The may be accessed by a client 908.

Figure 10:
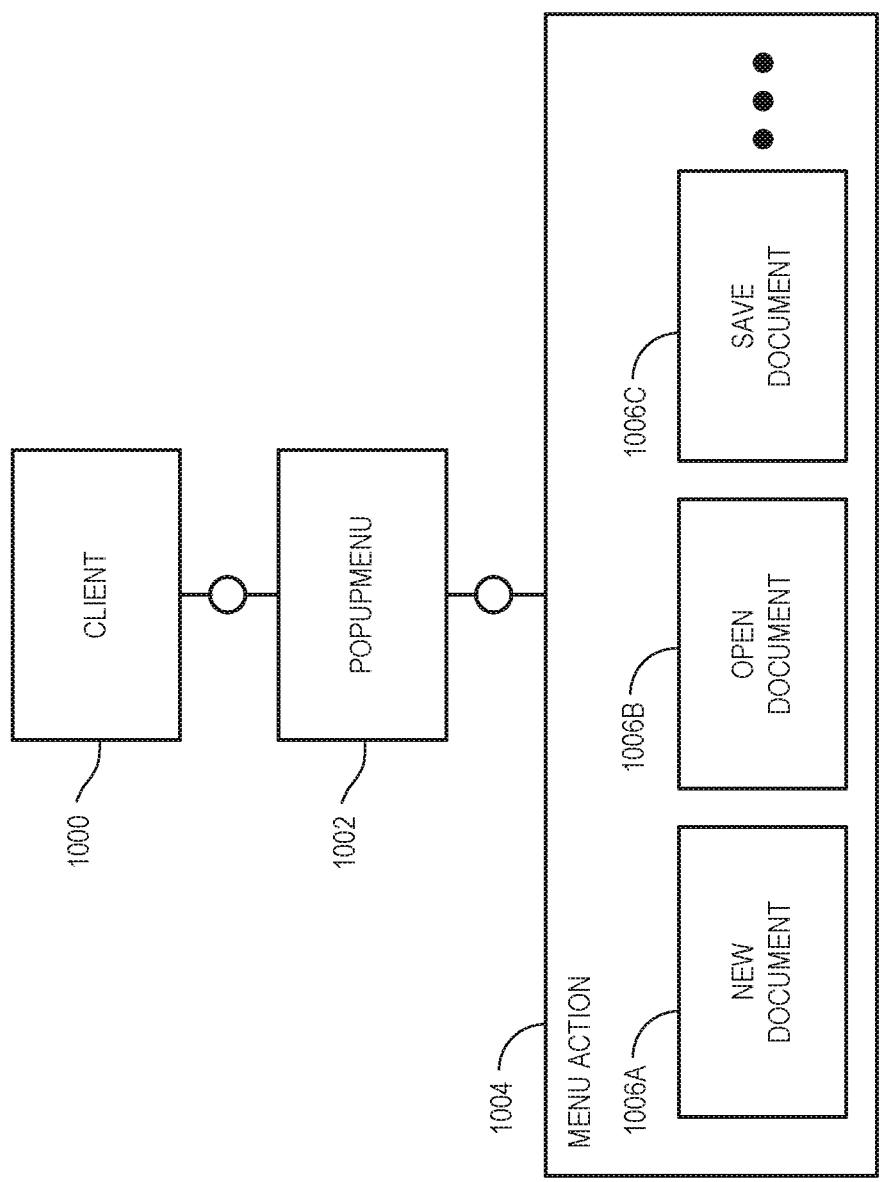
FIG. 10 is a diagram illustrating an example of multiple service implementations, in accordance with an example embodiment.

Additionally, a service can be implemented multiple times. At runtime, the complete list of implementing services can be displayed or provided and the caller can choose which implantation to choose. FIG. 10 is a diagram illustrating an example of multiple service implementations, in accordance with an example embodiment. Here, a client 1000 can call a popup menu 1002. The popup menu 1002 may depend on a menu action service 1004. Multiple components 1006A, 1006B, 1006C may contribute a different implementation of the menu action service 1004. Implementations may include, for example, new document 1006A, open document 1008B, and save document 1008C.

In an example embodiment, bundle aggregation may be utilized. Over time, there may be more and more bundles to load at a given point in time in execution, leading to more and more round trips. Bundle minification can help reduce round trips by combining files within a bundle into a single file, resulting in only one round trip to obtain all of a bundle's content. However, as the number of bundles increases, bundle minification is not enough. Bundle aggregation can help to address this issue by combining content from multiple bundles into one round trip.

In bundle aggregation, the client interacts with a single endpoint on the server that fetches requested bundle content and dynamically aggregates the content together at request time. In order for bundle content to be resolved into the correct contexts, the server then can insert context switches between aggregated bundles. Additionally, a callback tied to the request can be invoked to pass the loaded list of bundles back to the client, which can then load the bundles into the kernel.

Figure 11:
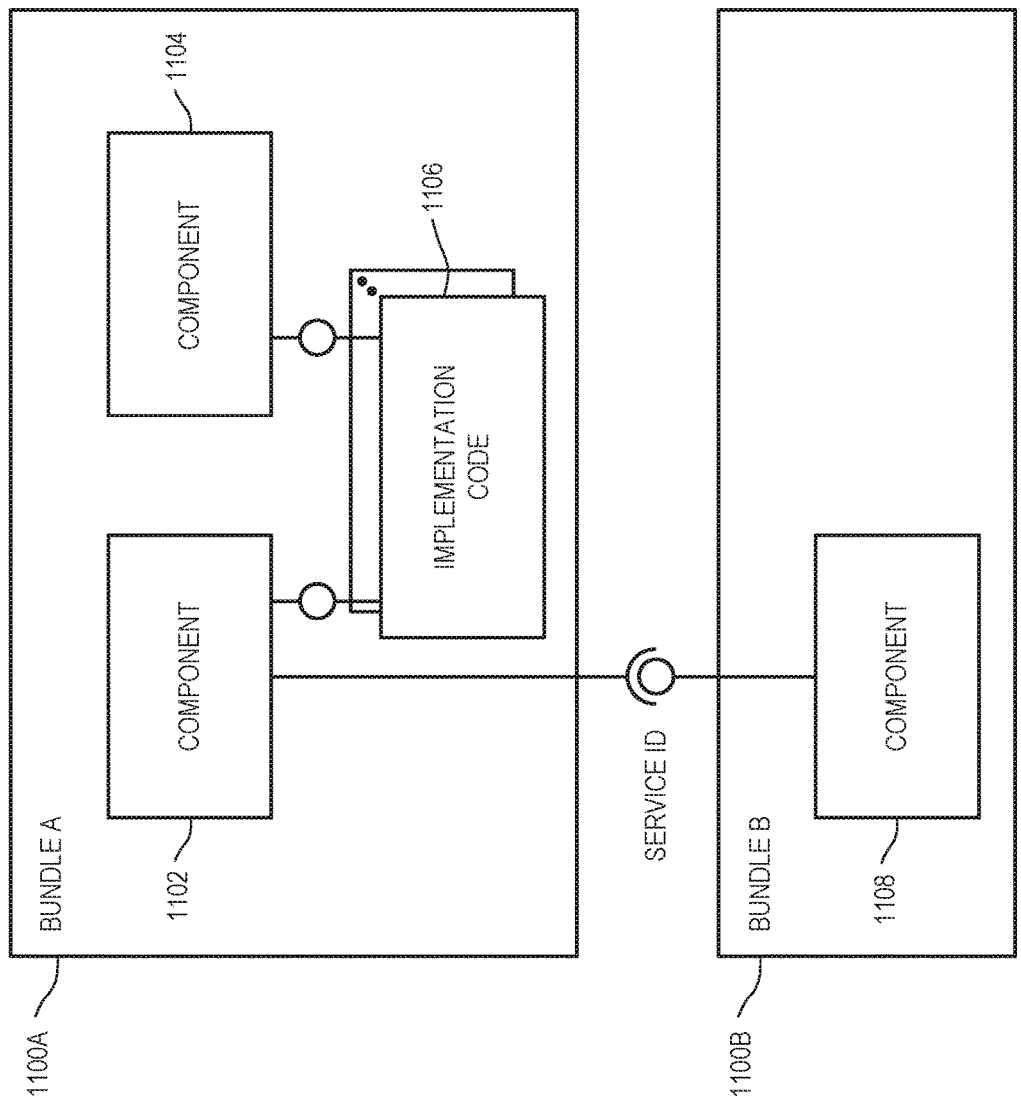
FIG. 11 is a block diagram illustrating an example of multiple bundles, in accordance with an example embodiment.

Technically, abstract dependencies are only needed between components that exist in separate bundles. It is possible for communication within a bundle to use abstract dependencies, but more typically components within a bundle would share internal implementation code and thus not need to go through the services exposed by the bundle. This is depicted in FIG. 11. FIG. 11 is a block diagram illustrating an example of multiple bundles 1100A-1100B, in accordance with an example embodiment. Bundle 1100A has component 1102 and component 1104. Both components 1102, 1104 are free to directly depend on implementation code 1106 within the bundle 1100A. When a component dependency crosses bundles, however, such as the dependency between component 1102 in bundle 1100A and component 1108 in bundle 1100B, they can be represented as abstract dependencies. As such, the framework does not interfere with or constrain the internal organization of a bundle.

Figure 12:
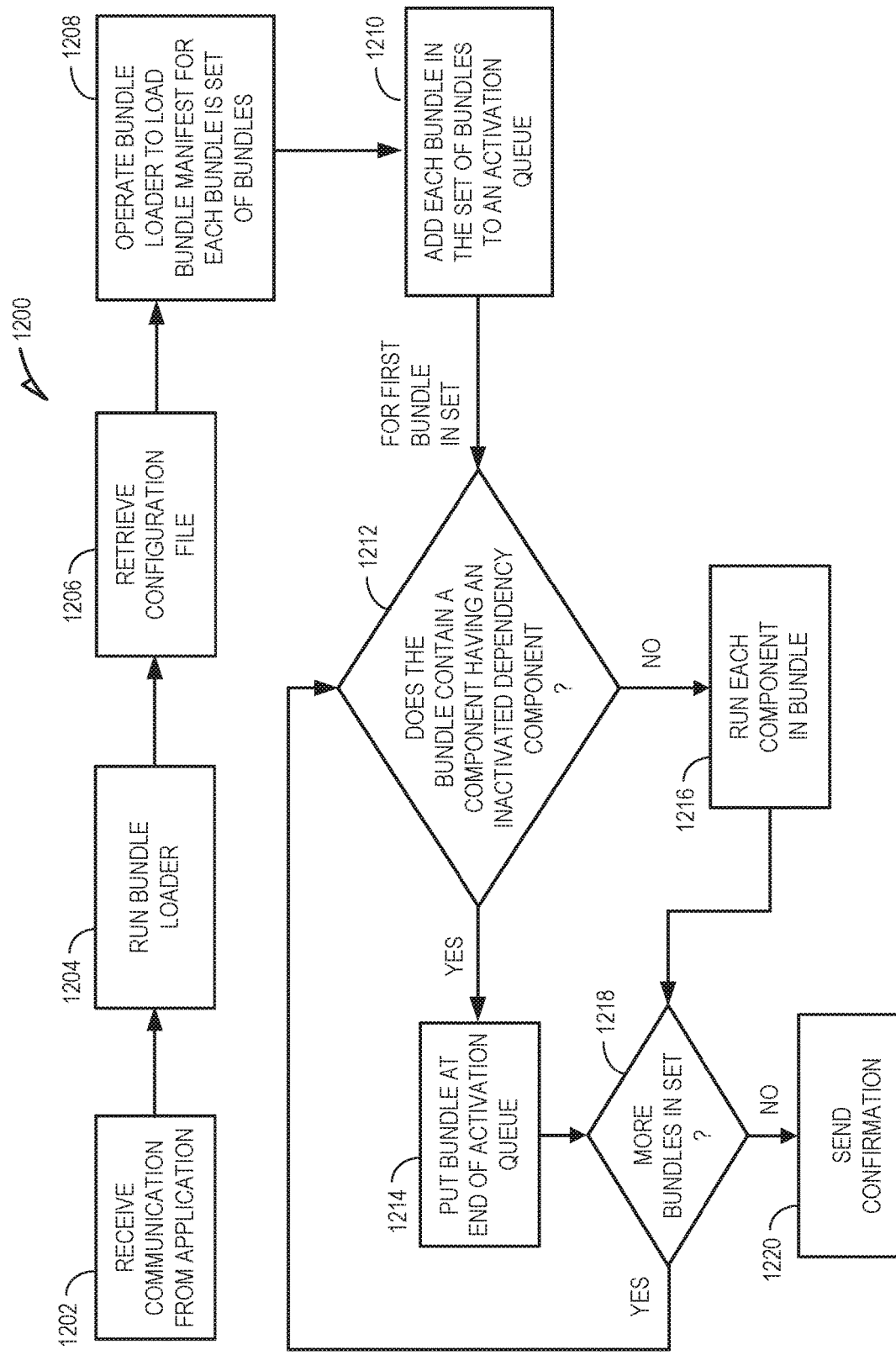
FIG. 12 is a flow diagram illustrating a method, in accordance with an example embodiment, for providing an extensibility framework.

FIG. 12 is a flow diagram illustrating a method 1200, in accordance with an example embodiment, for providing an extensibility framework. At operation 1202, a communication from an application is received. This communications may indicate that one or more components in a plurality of bundles in the application should be run. In an example embodiment, this communication may be generated by a core of an application and received by a bootstrap in an extensibility framework. The plurality of bundles may include at least one bundle having a component that depends on a dependency component in another of the plurality of bundles. At operation 1204, a bundle loader is run. At operation 1206, a configuration file is retrieved. This configuration file may indicate a set of the plurality of bundles to load in the bundle loader. At operation 1208, the bundle loader is operated to load a bundle manifest for each bundle in the set of the plurality of bundles to load. At 1210, each bundle in the set of plurality of bundles to load is added to an activation queue. Then a loop is begun for each of the bundles in the set of bundles to load. At operation 1212, it is determined if the bundle contains a component having an unactivated dependency component. An unactivated dependency component is a dependency component that has not been activated yet. In an example embodiment, the dependency component may operate a service. If so, then at operation 1214 the bundle is put at the end of the activation queue. If not, then at operation 1216 each component in the bundle is run. This may include using information from any activated dependency component for the components in the bundle. At operation 1218, it may be determined if there are any more bundles in the set of bundles to load. If so, then the process may loop to operation 1212. If not, then at operation 1220 a confirmation that all bundles have been loaded can be sent.

Example Mobile Device

Figure 13:
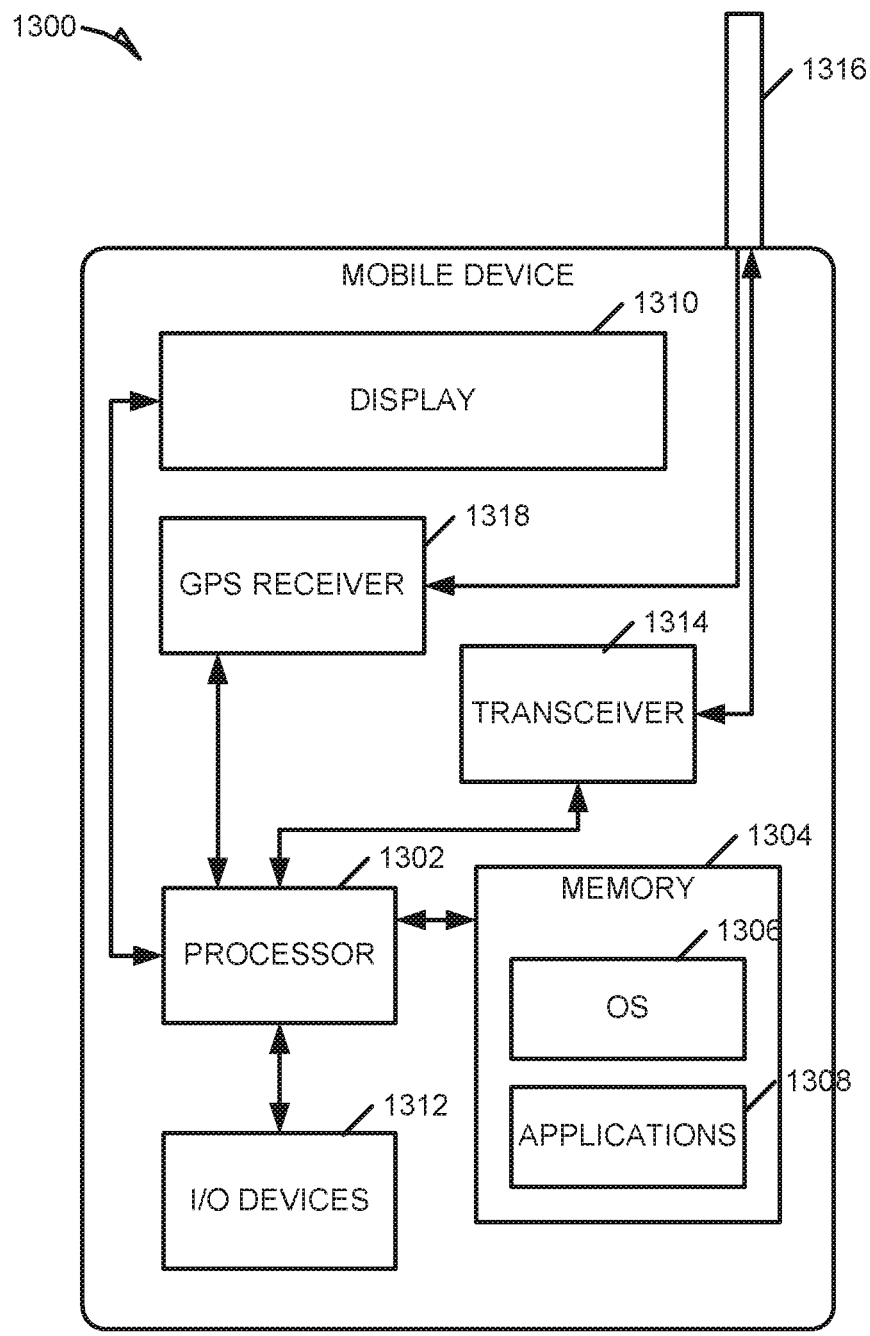
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1302 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1302 or other programmable processor 1302) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1302 configured using software, the general-purpose processor 1302 may be configured as respective different hardware-implemented modules at different times. Software may accordingly configure a processor 1302, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 1302 or processor-implemented modules. The performance of certain of the operations may be distributed among the one or more processors 1302, not only residing within a single machine, but deployed across a number of machines. In some example embodiments, the processor 1302 or processors 1302 may be located in a single location (e.g., within a home environment, an office environment or as a server farm), while in other embodiments the processors 1302 may be distributed across a number of locations.

The one or more processors 1302 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1302, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1302 executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 1302), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
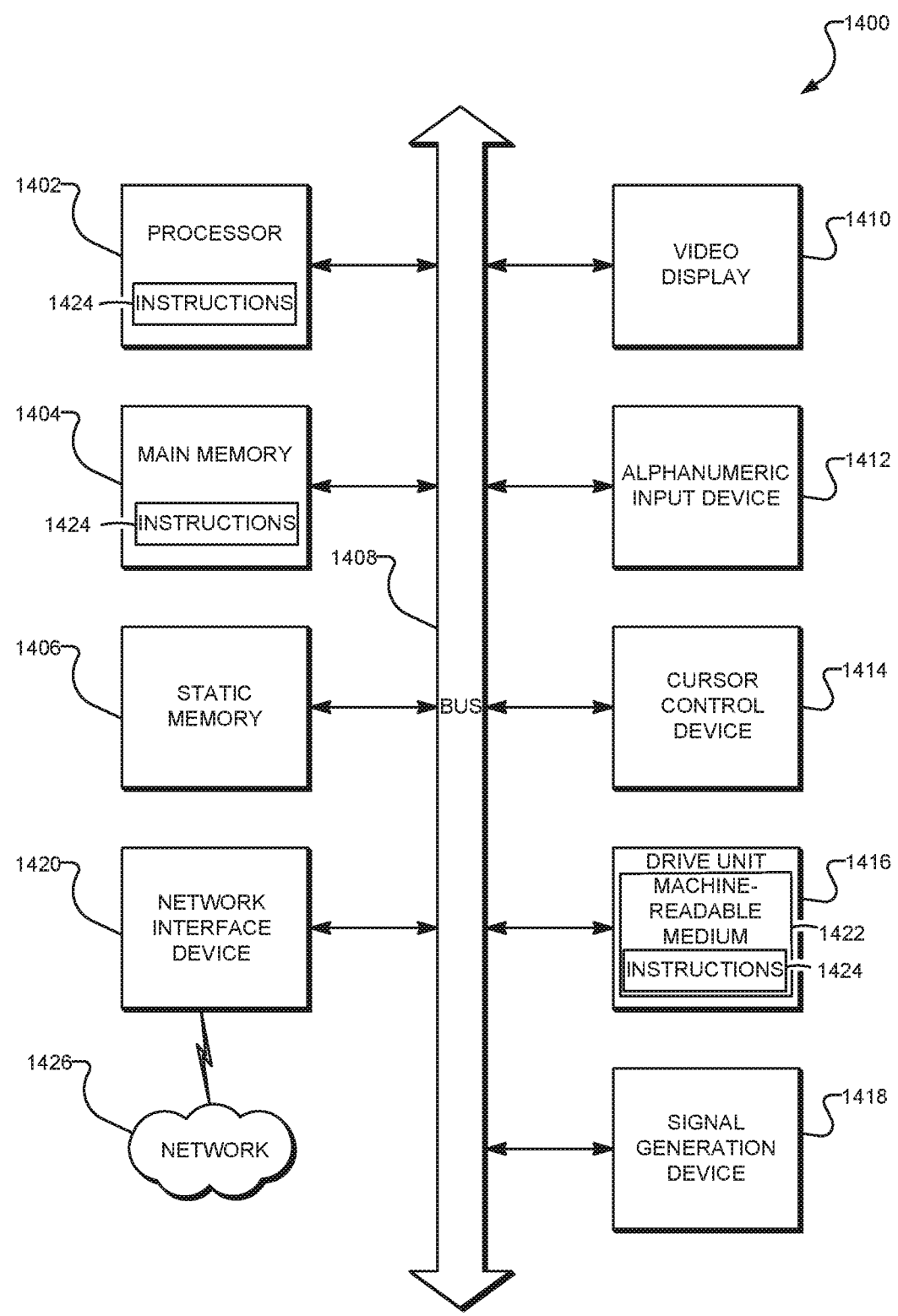
FIG. 14 is a block diagram of machine in the example form of a computer system within which instructions, for causing the machine to perform any one or more of the methodologies discussed herein, may be executed.

FIG. 14 is a block diagram of machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions 1424 for execution by the machine and that cause the machine to perform any one or more of the methodologies of the present disclosure or that is capable of storing, encoding or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
running a bundle loader in response to a communication from an application, the communication indicating that a plurality of bundles of components in the application are to be executed, the plurality of bundles including a first bundle having a component that depends on a dependency component in another of the plurality of bundles but whose dependency is not specified in the first bundle, the bundler loader performing loading of the plurality of bundles by executing operations comprising:
retrieving a configuration file indicating a first set of the plurality of bundles to load in the bundle loader;
adding each bundle in the first set of plurality of bundles to an activation queue;
operating the bundle loader to load a bundle manifest for each bundle in the first set of the plurality of bundles, the bundle manifest for the first bundle specifying an abstract dependency between the first bundle and a service; and
for each of bundles in the first set of plurality of bundles:
activating the bundle, using the bundle loader, subsequent to the loading of the bundle manifest for each bundle in the first set of the plurality of bundles, if no unactivated dependency component exists for any component in the bundle, wherein the activating includes requesting a service implementation, from a service registry, for any abstract dependencies specified in the bundle manifest for the bundle, receiving one or more service implementations from the service registry, and running each component in the bundle using the one or more service implementations, wherein the activating the bundle comprises activating the bundle at a head of the activation queue if no unactivated dependency component exists for any component in the bundle and, for each of bundles in the first set of plurality of bundles, placing the bundle at an end of the activation queue if an unactivated dependency component exists for any component in the bundle.

2. The method of claim 1, wherein the dependency component operates a service utilized by the component that depends on the dependency component.

3. The method of claim 1, wherein the plurality of bundles is combined with a separate plurality of bundles in a feature.

4. The method of claim 1, wherein the operating the bundle loader includes loading the bundle manifest in a service registry for each bundle in the first set of the plurality of bundles.

5. The method of claim 4, wherein the activating includes using the service registry in a determination of whether an unactivated dependency component exists for any component in the bundle.

6. The method of claim 1, wherein the bundle loader uses a plurality of bundle loader plugins, each bundle loader plugin providing a mechanism to load a different type of service.

7. The method of claim 1, further comprising:
for a second bundle in the plurality of bundles, loading bundle metadata for the second bundle while deferring component implementation for the second bundle.

8. A system comprising:
one or more processors;
a computer-readable medium having instructions stored thereon, which, when executed by the one or more processors, cause the system to:
run a bundle loader in response to a communication from an application, the communication indicating that a plurality of bundles of components in the application are to be executed, the plurality of bundles including a first bundle having a component that depends on a dependency component in another of the plurality of bundles but whose dependency is not specified in the first bundle, the bundler loader performing loading of the plurality of bundles by executing operations comprising:
retrieve a configuration file indicating a first set of the plurality of bundles to load in the bundle loader;
add each bundle in the first set of plurality of bundles to an activation queue;
operate the bundle loader to load a bundle manifest for each bundle in the first set of the plurality of bundles, the bundle manifest for the first bundle specifying an abstract dependency between the first bundle and a service; and
for each of bundles in the first set of plurality of bundles:
activate the bundle, using the bundle loader, subsequent to the loading of the bundle manifest for each bundle in the first set of the plurality of bundles, if no unactivated dependency component exists for any component in the bundle, wherein the activating includes requesting a service implementation, from a service registry, for any abstract dependencies specified in the bundle manifest for the bundle, receiving one or more service implementations from the service registry, and running each component in the bundle using the one or more service implementations, wherein the activating the bundle comprises activating the bundle at a head of the activation queue if no unactivated dependency component exists for any component in the bundle and, for each of bundles in the first set of plurality of bundles, placing the bundle at an end of the activation queue if an unactivated dependency component exists for any component in the bundle.

9. The system of claim 8, wherein the bundle loader uses a plurality of bundle loader plugins, each bundle loader plugin providing a mechanism to load a different type of service.

10. The system of claim 8, wherein the dependency component operates a service utilized by the component that depends on the dependency component.

11. The system of claim 8, wherein the plurality of bundles is combined with a separate plurality of bundles in a feature.

12. The system of claim 8, wherein the operating the bundle loader includes loading the bundle manifest in a service registry for each bundle in the set of the plurality of bundles to load.

13. The system of claim 12, wherein the activating includes using the service registry in a determination of whether an unactivated dependency component exists for any component in the bundle.

14. A non-transitory machine-readable storage medium comprising instructions, which when implemented by one or more machines, cause the one or more machines to perform operations comprising:
running a bundle loader in response to a communication from an application, the communication indicating that a plurality of bundles of components in the application are to be executed, the plurality of bundles including a first bundle having a component that depends on a dependency component in another of the plurality of bundles but whose dependency is not specified in the first bundle, the bundler loader performing loading of the plurality of bundles by executing operations comprising:
retrieving a configuration file indicating a first set of the plurality of bundles to load in the bundle loader;
adding each bundle in the first set of plurality of bundles to an activation queue;
operating the bundle loader to load a bundle manifest for each bundle in the first set of the plurality of bundles, the bundle manifest for the first bundle specifying an abstract dependency between the first bundle and a service; and
for each of bundles in the first set of plurality of bundles:
activating the bundle, using the bundle loader, subsequent to the loading of the bundle manifest for each bundle in the first set of the plurality of bundles, if no unactivated dependency component exists for any component in the bundle, wherein the activating includes requesting a service implementation, from a service registry, for any abstract dependencies specified in the bundle manifest for the bundle, receiving one or more service implementations from the service registry, and running each component in the bundle using the one or more service implementations, wherein the activating the bundle comprises activating the bundle at a head of the activation queue if no unactivated dependency component exists for any component in the bundle and, for each of bundles in the first set of plurality of bundles, placing the bundle at an end of the activation queue if an unactivated dependency component exists for any component in the bundle.

15. The non-transitory machine-readable storage medium of claim 14, wherein the dependency component operates a service utilized by the component that depends on the dependency component.

16. The non-transitory machine-readable storage medium of claim 14, wherein the plurality of bundles is combined with a separate plurality of bundles in a feature.

17. The non-transitory machine-readable storage medium of claim 14, wherein the operating the bundle loader includes loading the bundle manifest in a service registry for each bundle in the first set of the plurality of bundles.

18. The non-transitory machine-readable storage medium of claim 17, wherein the activating includes using the service registry in a determination of whether an unactivated dependency component exists for any component in the bundle.

19. The non-transitory machine-readable storage medium of claim 14, wherein the bundle loader uses a plurality of bundle loader plugins, each bundle loader plugin providing a mechanism to load a different type of service.

* * * * *